United States Patent
Wittekind et al.

(10) Patent No.: US 8,212,373 B2
(45) Date of Patent: *Jul. 3, 2012

(54) WIND PLANT AND METHOD FOR INCREASING ENERGY CAPTURE IN A WIND PLANT

(75) Inventors: Lothar Wittekind, Keil (DE); Renjith Viripullan, Bangalore (IN); Martin Staedler, Berlin (DE)

(73) Assignee: General Electric Company, Schenectady, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/309,681

(22) Filed: Dec. 2, 2011

(65) Prior Publication Data

US 2012/0091714 A1  Apr. 19, 2012

Related U.S. Application Data

(62) Division of application No. 12/128,861, filed on May 29, 2008, now Pat. No. 8,093,737.

(51) Int. Cl.
 *F03D 9/00* (2006.01)
 *H02P 9/04* (2006.01)
(52) U.S. Cl. ............................................. 290/44
(58) Field of Classification Search .......... 290/44, 290/55; 415/1, 2.1, 4.1, 4.5; 416/1, 7, 132 B
See application file for complete search history.

(56) References Cited

U.S. PATENT DOCUMENTS

| | | | |
|---|---|---|---|
| 3,665,274 A | 5/1972 | Born et al. | |
| 4,703,189 A | 10/1987 | DiValentin et al. | |
| 5,289,041 A | 2/1994 | Holley | |
| 7,015,595 B2 | 3/2006 | Feddersen et al. | |
| 8,093,737 B2 * | 1/2012 | Wittekind et al. | 290/44 |
| 2004/0108732 A1 | 6/2004 | Weitkamp | |
| 2006/0214428 A1 * | 9/2006 | Altemark et al. | 290/44 |
| 2008/0084068 A1 | 4/2008 | Shibata et al. | |
| 2010/0135789 A1 | 6/2010 | Zheng et al. | |

* cited by examiner

*Primary Examiner* — Julio Gonzalez Ramirez
(74) *Attorney, Agent, or Firm* — McNees Wallace & Nurick LLC

(57) ABSTRACT

Method for increasing energy capture in wind plants includes providing a plurality of wind turbines having a variable speed control system including an initial rotational speed set point value which is a maximum rotational speed set point for wind turbines. Method includes obtaining at least two measured operational parameters from one or more sensors and comparing measured operational parameters to mechanical load of turbine. If mechanical load of turbine is decreased as a result of measured operational parameters, a speed control adjustment method is activated. Speed control adjustment method includes determining an adjusted rotational speed set point greater than initial rotational speed set point value in response to at least two measured and compared operational parameters and configuring control system with adjusted rotational speed set point where adjusted rotational speed set point increases maximum rotational speed set point of wind turbines.

17 Claims, 5 Drawing Sheets

WIND PLANT AND METHOD FOR INCREASING ENERGY CAPTURE IN A WIND PLANT

CROSS REFERENCE TO RELATED APPLICATIONS

This application claims priority to and is a divisional application of U.S. patent application Ser. No. 12/128,861, filed May 29, 2008, entitled "Method for Increasing Energy Capture in a Wind Turbine," now allowed, the disclosure of which is incorporated by reference in its entirety.

FIELD OF THE INVENTION

The present invention is directed generally to wind turbines, and more particularly to a method for increasing energy capture. In particular, the present invention is directed to controlling the speed of rotation of the wind turbine blades to increase the amount of energy capture.

BACKGROUND OF THE INVENTION

Recently, wind turbines have received increased attention as environmentally safe and relatively inexpensive alternative energy sources. With this growing interest, considerable efforts have been made to develop wind turbines that are reliable and efficient.

Generally, a wind turbine includes a rotor having multiple blades. The rotor is mounted to a housing or nacelle, which is positioned on top of a truss or tubular tower. Utility grade wind turbines (i.e., wind turbines designed to provide electrical power to a utility grid) can have large rotors (e.g., 30 or more meters in length). In addition, the wind turbines are typically mounted on towers that are at least 60 meters in height. Blades on these rotors transform wind energy into a rotational torque or force that drives one or more generators that may be rotationally coupled to the rotor through a gearbox. The gearbox steps up the inherently low rotational speed of the turbine rotor for the generator to efficiently convert mechanical energy to electrical energy, which is fed into a utility grid.

During normal operation, wind turbines with sophisticated control system maintain constant speed and power by active blade pitch control. The initial design of a wind turbine controls may use standards such as IEC 61400. In the control configuration, the standardized environmental conditions such as average wind speed, turbulence intensity or air density are the basis for the design. The IEC standard defines a small number of different "type classes" that categorize a wind turbine design for broader range of environmental conditions. As such, the standard controller configuration fails to address all of the types of site locations on which the wind turbine may be installed.

For example, many wind turbine sites include more favorable environmental conditions that give less stress on the actual wind turbine than the design conditions. At these sites, it is possible to use this application to increase the wind turbine performance, using a higher average rotor speed, without damaging wind turbine components.

Therefore, what is needed is a method for operating a wind turbine that permits increased energy capture by controlling the rotor speed in response to measured or calculated operational parameters.

SUMMARY OF THE INVENTION

One aspect of the present invention includes a method for operating a wind turbine. The method includes providing a wind turbine having a variable speed control system, the control system having an initial rotational speed set point. At least two operational parameters are obtained from one or more sensors. An adjusted rotational speed set point greater than the initial rotational speed set point is determined in response to the operational parameter. The control system is configured with the adjusted rotational speed set point.

Another aspect of the present disclosure includes a wind turbine having a variable speed control system. The control system has an initial rotational speed set point. The wind turbine also includes at least one sensor arranged and disposed to obtain at least two operational parameters. The control system is selectively configured with an adjusted rotational speed set point greater than the initial rotational speed set point in response to the operational parameter.

Still another aspect of the present invention includes a wind plant having a plurality of wind turbines. The wind turbines each include a variable speed control system. The control system has an initial rotational speed set point. At least one sensor arranged and disposed to obtain at least two operational parameters. The control system is selectively configured with an adjusted rotational speed set point greater than the initial rotational speed set point in response to the operational parameter. The wind plant further includes a central monitoring station. The central monitoring station is configured to selectively permit adjustment of the control system in response to an external requirement.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
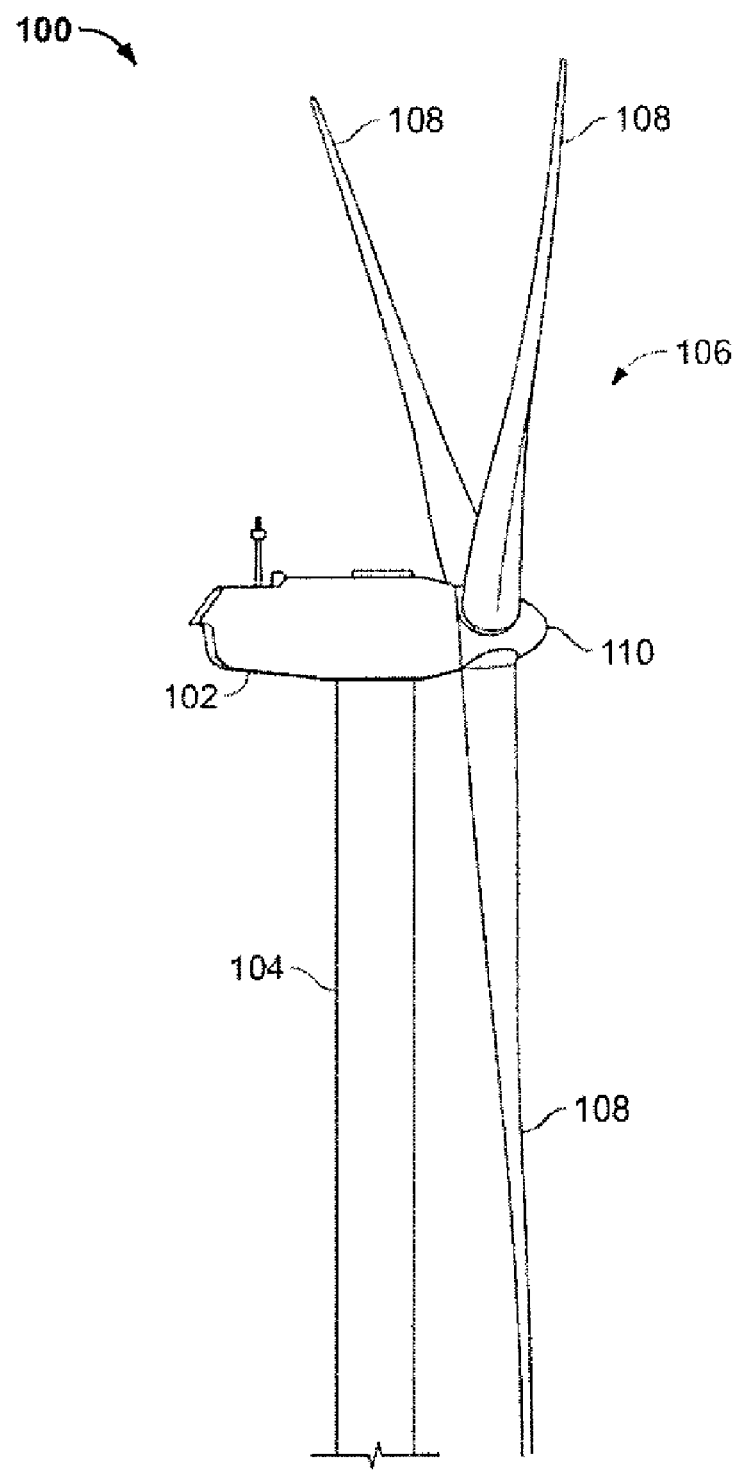
FIG. 1 is an illustration of an exemplary configuration of a wind turbine.

Referring to FIG. 1, an exemplary wind turbine 100 according to the present invention is disclosed. The wind turbine 100 includes a nacelle 102 mounted atop a tall tower 104, only a portion of which is shown in FIG. 1. Wind turbine 100 also comprises a wind turbine rotor 106 that includes one or more rotor blades 108 attached to a rotating hub 110. Although wind turbine 100 illustrated in FIG. 1 includes three rotor blades 108, there are no specific limits on the number of rotor blades 108 required by the present invention. The height of tower 104 is selected based upon factors and conditions known in the art.

Figure 2:
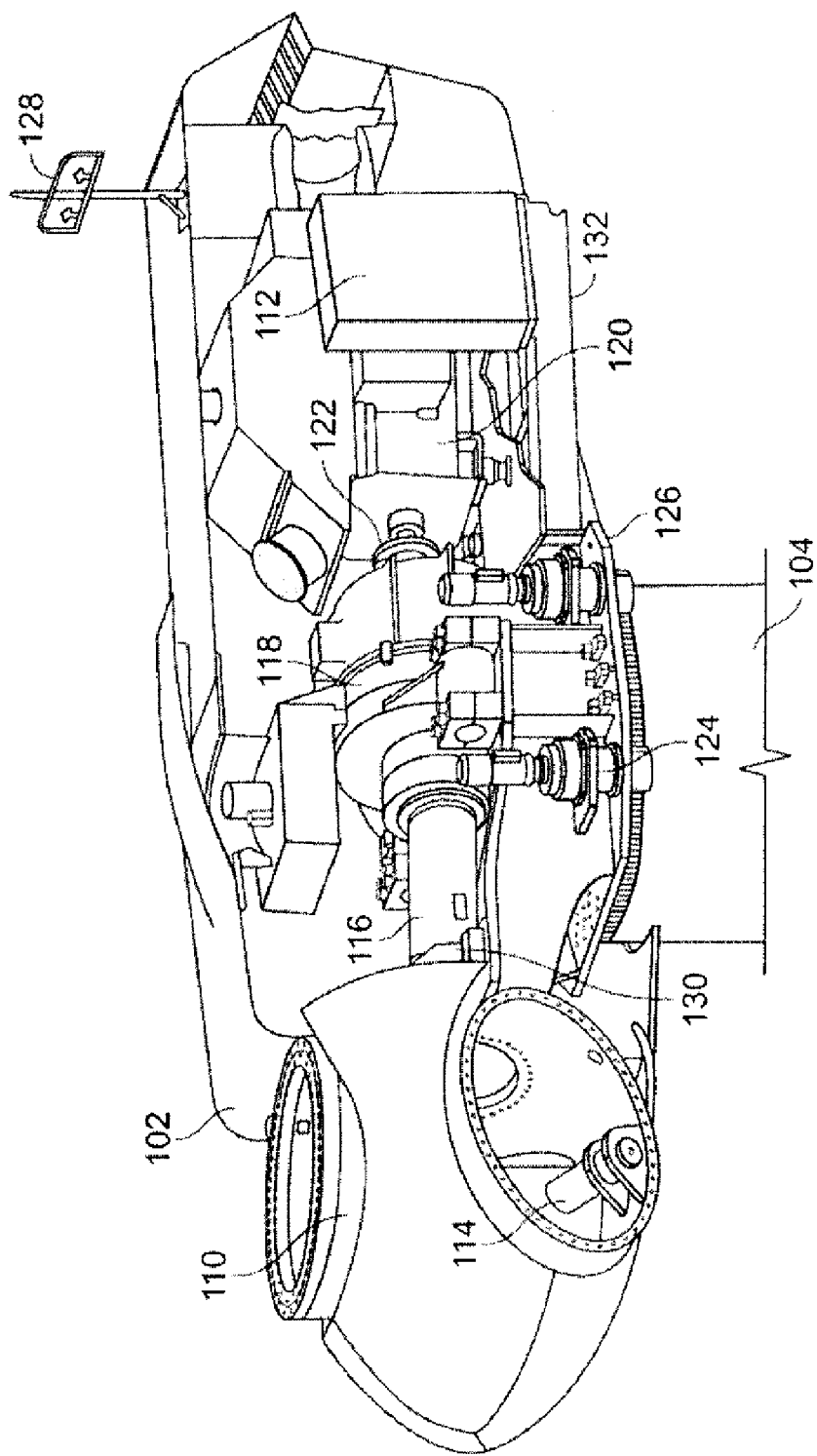
FIG. 2 is a cut-away perspective view of a nacelle of the exemplary wind turbine configuration shown in FIG. 1.

In some configurations and referring to FIG. 2, various components are housed in nacelle 102 atop tower 104. One or more microcontrollers or other control components (not shown) are housed within control panel 112. The microcontrollers include hardware and software configured to provide a control system providing overall system monitoring and control, including pitch and speed regulation, high-speed shaft and yaw brake application, yaw and pump motor application and fault monitoring. In alternative embodiments of the disclosure, the control system may be a distributed control architecture not solely provided for by the control panel 112 as would be appreciated by one of ordinary skill in the art. The control system provides control signals to a variable blade pitch drive 114 to control the pitch of blades 108 (FIG. 1) that drive hub 110 as a result of wind. In some configurations, the pitches of blades 108 are individually controlled by blade pitch drive 114.

The drive train of the wind turbine includes a main rotor shaft 116 (also referred to as a "low speed shaft") connected to hub 110 and supported by a main bearing 130 and, at an opposite end of shaft 116, to a gear box 118. Gear box 118, in some configurations, utilizes a dual path geometry to drive an enclosed high-speed shaft. The high-speed shaft (not shown in FIG. 2) is used to drive generator 120, which is mounted on mainframe 132. In some configurations, rotor torque is transmitted via coupling 122. Generator 120 may be of any suitable type, for example, a wound rotor induction generator.

Yaw drive 124 and yaw deck 126 provide a yaw orientation system for wind turbine 100. Anemometry provides information for the yaw orientation system, including measured instantaneous wind direction and wind speed at the wind turbine. Anemometry may be provided by a wind vane 128. In some configurations, the yaw system is mounted on a flange provided atop tower 104. The present disclosure is not limited to the configuration shown in FIGS. 1 and 2 and may include any configuration of wind turbine 100 known in the art having a control system and rotational speed control. For example, the wind turbine 100 may include more or less than three blades 108.

Figure 3:
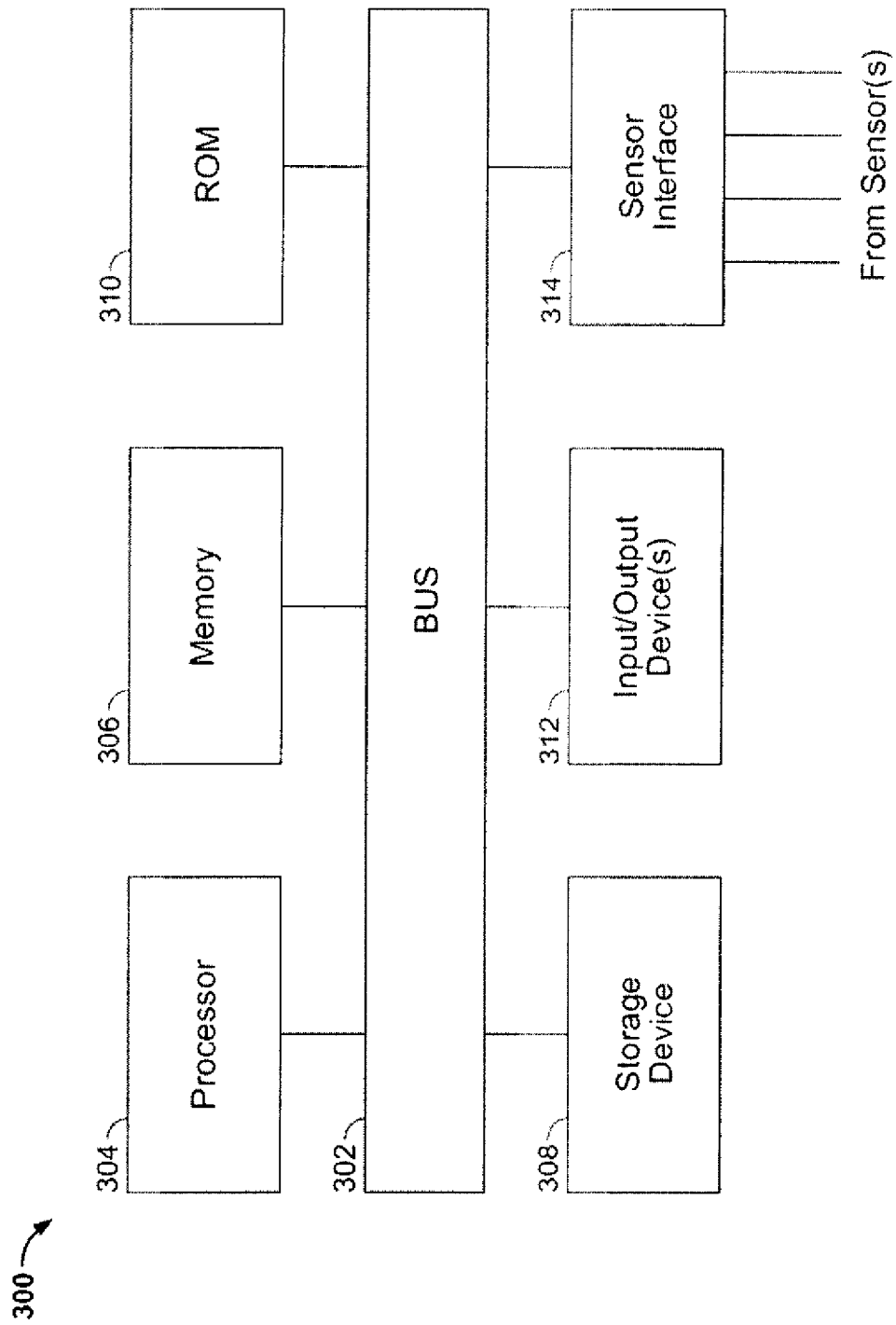
FIG. 3 is a block diagram of an exemplary configuration is a block diagram of an exemplary configuration of a control system for the wind turbine configuration shown in FIG. 1.

In some configurations and referring to FIG. 3, an exemplary control system 300 for wind turbine 100 includes a bus 302 or other communications device to communicate information. Processor(s) 304 are coupled to bus 302 to process information, including information from sensors configured to measure displacements or moments. Control system 300 further includes random access memory (RAM) 306 and/or other storage device(s) 308. RAM 306 and storage device(s) 308 are coupled to bus 302 to store and transfer information and instructions to be executed by processor(s) 305. RAM 306 (and also storage device(s) 308, if required) can also be used to store temporary variables or other intermediate information during execution of instructions by processor(s) 305. Control system 300 can also include read only memory (ROM) and or other static storage device 310, which is coupled to bus 302 to store and provide static (i.e., non-changing) information and instructions to processor(s) 304. Input/output device(s) 312 can include any device known in the art to provide input data to control system 300 and to provide yaw control and pitch control outputs. Instructions are provided to memory from a storage device, such as magnetic disk, a read-only memory (ROM) integrated circuit, CD-ROM, DVD, via a remote connection that is either wired or wireless providing access to one or more electronically-accessible media, etc. In some embodiments, hard-wired circuitry can be used in place of or in combination with software instructions. Thus, execution of sequences of instructions is not limited to any specific combination of hardware circuitry and software instructions. Sensor interface 314 is an interface that allows control system 300 to communicate with one or more sensors. Sensor interface 314 can be or can comprise, for example, one or more analog-to-digital converters that convert analog signals into digital signals that can be used by processor(s) 304. In one embodiment, the sensor interface includes signals from a rotor speed determining device and anemometry from wind vane 128.

The present disclosure includes a method for increasing energy capture of a wind turbine by controllably adjusting the maximum or rated rotational speed set point in response to a measured operational value. "Rotational speed", as utilized herein, is defined as the speed at which the blades rotate about the hub. The rotational speed may include the speed at which the low speed shaft 116 rotates or may be calculated from the speed of the high-speed shaft or at the generator 120. "Rated power", as utilized herein, is defined as the power that the wind turbine generates at a maximum capacity, wherein the maximum capacity is determined by the control system. "Rated rotational speed", as utilized herein, is defined as the speed at which the rotor is permitted to rotate in continuous operations during full load operations. The rated rotational speed may correspond to the maximum power capacity, but may include wind turbine operation below the maximum power capacity.

In one embodiment, the controlled adjustment may include a feature installed on an existing wind turbine with no modification of the wind turbine components. During the period of time of increased maximum rotor speed set point, the wind turbine is able to run at a higher rated power and achieve a significantly higher energy production. In this embodiment, no components of the turbine need to be changed or added.

The method includes operating a wind turbine having a variable speed control system. As discussed above, wind turbine control systems typically include sophisticated control systems and control programs. The control programs utilize wind turbine components to adjust various operational parameters within the wind turbine 100. For example, pitch blade angle and generator torque may be adjusted to vary the power output at the generator 120 and/or to adjust the rotational speed of the blades 108 in response to a wind speed. Typically, the wind turbine 100 will include a variable speed operational period (e.g., operation during shutdown and startup) and a constant speed operational period (e.g., during normal operating conditions or at maximum rated power operation). For the constant speed operational period, the control system includes an initial or rated rotational speed set point value. The initial rotational speed set point value corresponds to the designed maximum rotational speed at which the wind turbine is permitted to operate. While not so limited, the initial rotational speed set point value may be determined according to known design parameters or standards, such as international standards (e.g., IEC 61400). In the control configuration, the standardized environmental conditions such as average wind speed, turbulence intensity or air density for a theoretical average wind turbine site may form the basis for the design and configuration. While during normal operation (i.e., the constant speed operational period), the rotational speed is not permitted to exceed the maximum rotational speed set point. It is noted, however, that power output of the wind turbine 100 may vary at the maximum rotational speed by varying other parameters, such as torque. The method of the present disclosure includes a method wherein the initial rated rotational speed set point value is increased from the initial value in response to at least two operational parameters. The operational parameters are measured at one or mores sensors at the wind turbine 100, at a monitoring station for a wind turbine plant, or at a location corresponding to the wind turbine operation.

The operational parameter are preferably selected from the group consisting of generator speed, power output, turbulence intensity (e.g., turbulence intensity measured as function of the standard deviation of the rotational speed), wind speed, wind direction (both in vertical and horizontal sense), wind shear, the combination of ambient temperature and air pressure, air density, component temperatures (e.g., generator windings, bearings, generator and gearbox cooling, gearbox oil, transformer, and/or converter), generator torque, current in generator rotor and stator, voltage in generator rotor and stator, power factor, tower top vibration, drive train vibrations, yaw position and combinations thereof. More preferably, the operational parameter is at least two parameters selected from the group consisting of an air turbulence intensity, air density, tower vibration, ambient temperature, wind turbine component temperature, yaw position and combinations thereof.

The sensors for measuring the operational parameters may be any suitable sensors known in the art for measuring or sensing the operational parameter. Suitable sensors may include thermometers, thermocouples, thermisters, anemometers, pressure sensors, optical sensors, proximity sensors, encoders (e.g., encoder mounted on the individual components) or any other known sensor or sensor system. The sensors may be included at the wind turbine location or at a location remote from the wind turbine, such as at a remote monitoring system. In addition, the sensor may indirectly measure an operational parameter, such as by measuring a value that may be utilized to calculate an operational parameter. In addition, a plurality of sensors may be utilized to determine a single operational parameter.

Once the operational parameters are obtained, an adjusted, increased, rotational speed set point value is determined in response to the operational parameter. The amount of increase in rotational speed can be determined using any suitable model or calculation that is capable of determining a rotor speed that is greater than the initial rotational speed set point, and provides an adjusted rotor speed that is mechanically permitted by the wind turbine 100 and the conditions surrounding the wind turbine 100. In one embodiment, the target rotational speed is a function of the standard deviation of the controlled rotational speed, which may be a measure of turbulence intensity. In addition, the increase in rotational speed set point value may be determined by the general relationship that as the annual average wind speed decreases, the mechanical loads on the wind turbine decrease, permitting an increase in rotational speed set point value. In addition, as the turbulence intensity decreases, the mechanical loads on the wind turbine decrease, permitting an increase in rotational speed set point value. Further, as the air density decreases, the mechanical loads on the wind turbine decrease, permitting an increase in rotational speed set point value. Likewise, as the ambient air temperature surrounding the wind turbine decreases significantly, the air density increases, permitting an increase in rotational speed set point value (this increase in set point would be lower than the case with higher density but higher than standard conditions). The above relationships are merely exemplary and are not exhaustive.

Combinations of two or more operational parameters are preferably utilized according to their respect relationships. For example, a lower ambient temperature and a higher air density are favorable for the cooling of the components, which results in lower mechanical loads on the wind turbine 100, permitting an increase in rotational speed set point value. A reduced power factor increases the electrical current and with that, the temperatures of components within the wind turbine 100, permitting an increase in rotational speed set point value. Also, with higher rotational speed, the temperature of some components of the wind turbine increases and other unfavorable component properties like voltage of the generator can increase. The new set point for the generator may be set, based on the parameters described above. For example, using the physical relationship of these parameters on turbine loads and power determines the new set point. For example, a measured standard density of 1.225 with medium turbulence, may result in a speed set point 6% greater than the initial rotational speed set point. In addition, if the measured density is 1.100 (i.e., lower than 1.225) adjust rotational speed set point will be set to 9% above the initial rotational speed set point.

Generally, the inverse relationships of the above operational parameters to the value of increased rotational speed set point result in a reduction in the amount of increase or prevents an increase in the rotational speed set point value. For example, during high wind events, high component temperatures or adverse meteorological conditions, the control system may only slightly increase the rotational speed set point value, or may not increase the rotational speed set point value.

Figure 4:
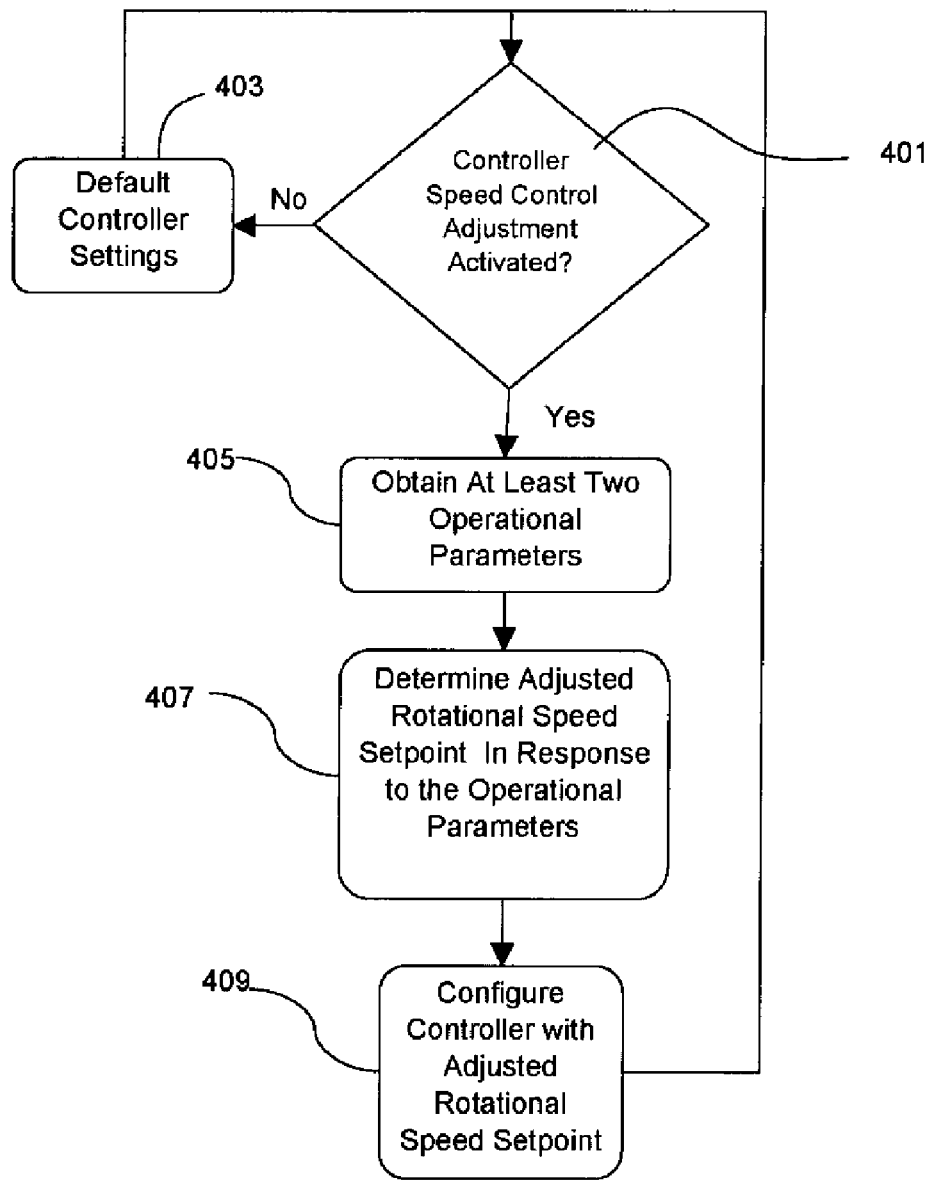
FIG. 4 is a process flow diagram of an exemplary method according to an embodiment of the present disclosure.

FIG. 4 shows a process flow diagram illustrating one embodiment of the present disclosure. In this embodiment, first, a determination is made to whether controller speed control adjustment is activated, step 401. If the controller speed is not activated the controller maintains default settings, step 403. The default settings include a setting of the speed control to the initial rotational speed set point value. The determination in step 401 may include a switch, button, software determined option, or other mechanism that permits the selective activation of the speed control adjustment method. If the speed control adjustment is activated, at least two operational parameters are obtained, step 405. The operational parameters are preferably obtained from sensors. Once the operational parameters are obtained, an adjusted rotational speed is determined in response to the operational parameters, step 407. The adjusted rotational speed is an adjusted rotational speed set point value for the control system that is greater than the initial or rated rotational speed set point value. The controller or control system is configured with the adjusted rotational speed set point, step 409. The control system permits the wind turbine to operate at the increased rotational speed set point value and the method repeats.

In one embodiment, a user interface is provided to provide the speed control activation, step 401. In this embodiment the interface, may include, but is not limited to, the following: 1) an option to set time of day to operate in boost, 2) an option to set maximum boost allowed—up to a (e.g., extreme loads defined) limit, 3) an option to control the wind turbine remotely from a central control with plant power limits and plant power factors incorporated in the control provided by the central control. The interface is not so limited and may include other options or other features, as desired for wind turbine and wind turbine plant operation.

In one embodiment, the ability for the controller to adjust the rotational set point value can be activated by an external requirement. Suitable external requirements that may activate the ability for the controller to adjust the maximum rotor speed include, but are not limited to, electrical (e.g., power factor or overall rating) or environmental site properties (e.g., wind speed, wind shear, turbulence). In one embodiment, an estimate of the lifetime or change in the lifetime of the turbine, e.g. calculated out of simulations of mechanical fatigue loads, based upon increased maximum rotor speeds may be communicated to a user, central monitoring station or other location. In addition, the external requirement may include electrical or site properties over the entire wind plant. For example, a wind plant comprising a plurality of wind turbines may include an external requirement of a maximum plant power output (i.e., the total power produced by the entire wind plant), which when exceeded selectively prevents wind turbines from increasing the rotational speed set point value in excess of the initial or rated rotational speed set point value.

Figure 5:
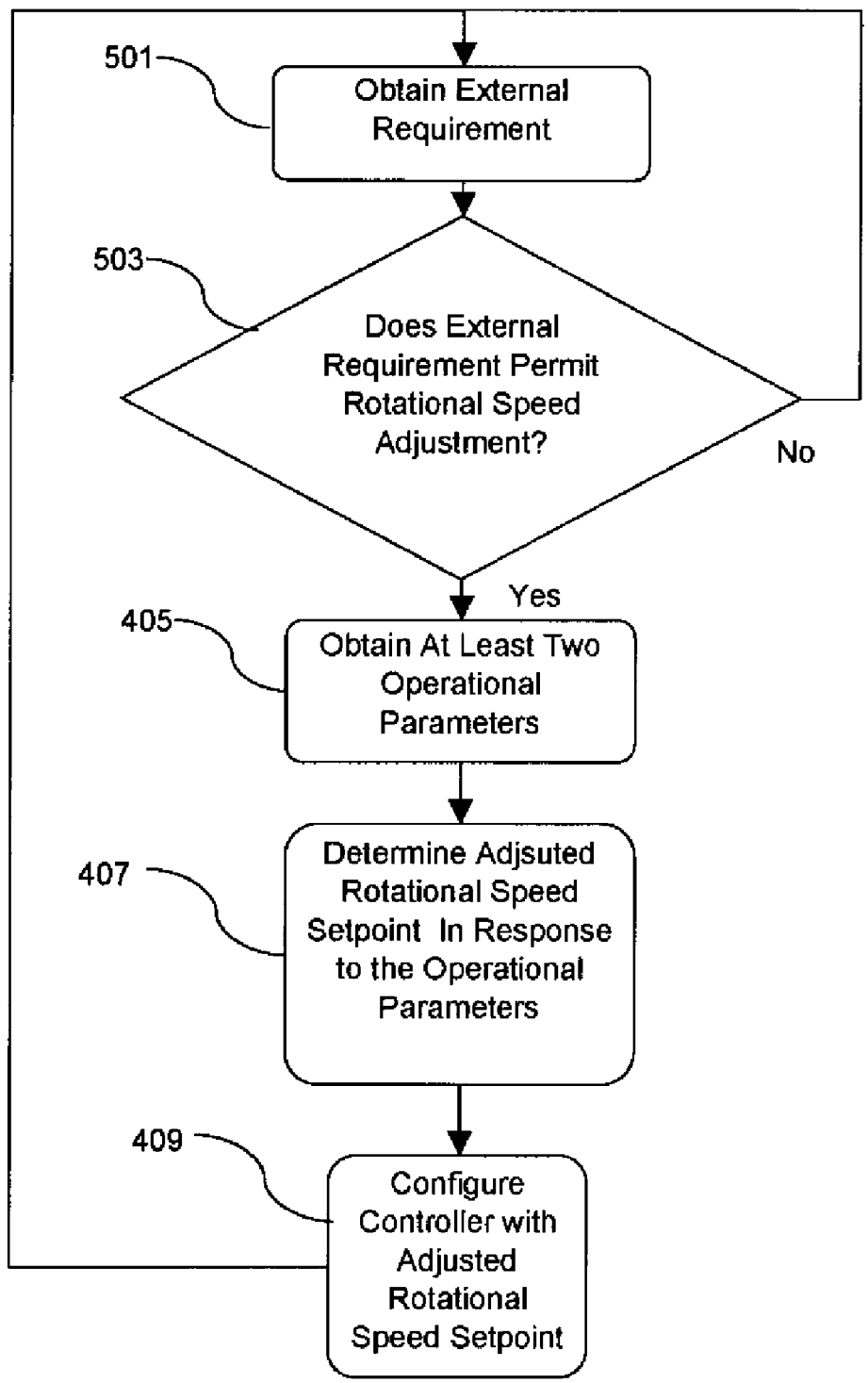
FIG. 5 is a process flow diagram of an exemplary method according to another embodiment of the present disclosure.

FIG. 5 shows a process flow diagram illustrating another embodiment of the present disclosure. The embodiment shown in FIG. 5 includes obtaining an external requirement, step 501. In this embodiment, first, a determination is made to whether the external requirement is satisfied, step 503. If the external requirement is not satisfied, the process is repeated and the rotational speed set point value is maintained at the initial rotational speed set point value. If the external requirement is satisfied, at least two operational parameters are obtained, step 405. The operational parameters are preferably obtained from sensors. Once the operational parameters are obtained, an adjusted rotational speed is determined in response to the operational parameters, step 407. The adjusted rotational speed is an adjusted rotational speed set point value for the control system that is greater than the initial or rated rotational speed set point value. The controller or control system is configured with the adjusted rotational speed set point, step 409. The control system permits the wind turbine to operate at the increased rotational speed set point value and the method repeats.

EXAMPLE

Example 1 includes results of simulations using the method of the present disclosure for annual energy production (AEP) in terms of percent increase for operation at rotational speed set points greater than the initial speed set point for varying wind speed averages ($V_{avg}$), see Table 1. In this example, the operational parameters are density and average wind speed.

TABLE 1

| | EXAMPLE 1 | |
|---|---|---|
| $V_{avg}$ | AEP Increase Density 1.225 | AEP Increase Density 1.100 |
| 7.00 | 3.22% | 4.54% |
| 7.50 | 3.50% | 5.00% |
| 8.00 | 3.74% | 5.41% |
| 8.50 | 3.97% | 5.78% |
| 10.00 | 4.50% | 6.62% |

The increase shown in Table 1 corresponds to an increase with respect to the AEP produced at the initial set point value or rated set point value of the wind turbine. The initial speed set point value or rated set point for the wind turbine corresponds to a 0% increase in AEP.

Example 2 shows rotational speed set points value variations with respect to the operational parameters of air density and turbulence intensity (TI), see Table 2.

TABLE 2

| | EXAMPLE 2 | |
|---|---|---|
| Air Density | Turbulence Intensity | Increase Of Set Point From Initial Speed Set Point |
| 1.100 | 16% | 9.70% |
| 1.225 | 16% | 6.25% |
| 1.270 | 16% | 3.00% |

The initial speed set point value or rated set point for the wind turbine corresponds to a 0% increase of set point from initial speed set point.

Example 3 shows annual energy production (AEP) variations with respect to the operational parameters of wind velocity, air density and turbulence intensity, see Table 3.

TABLE 3

| | EXAMPLE 3 | | |
|---|---|---|---|
| $V_{avg}$ | AEP Increase Density 1.225 High Turbulence | AEP Increase Density 1.225 Medium Turbulence | AEP Increase Density 1.225 Low Turbulence |
| 7.00 | 2.8% | 3.22% | 3.85% |
| 7.50 | 3.0% | 3.5% | 4.3% |
| 8.00 | 3.1% | 3.74% | 4.71% |
| 8.50 | 3.2% | 3.97% | 5.06% |
| 10.00 | 3.3% | 4.50% | 5.83% |

The increase shown in Table 3 corresponds to an increase with respect to the AEP produced at the initial set point value or rated set point value of the wind turbine. The initial speed set point value or rated set point for the wind turbine corresponds to a 0% increase in AEP.

Example 4 shows rotational speed set points value variations with respect to the operational parameters of air density and turbulence intensity, see Table 4.

TABLE 4

| | EXAMPLE 4 | |
|---|---|---|
| Air Density | Turbulence Intensity | Increase Of Set Point From Original Speed Set Point |
| 1.225 | 18% | 3.00% |
| 1.225 | 16% | 6.25% |
| 1.225 | 14% | 7.80% |

The initial speed set point value or rated set point for the wind turbine corresponds to a 0% increase of set point from initial speed set point.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A wind plant comprising:
a plurality of wind turbines, each of the plurality of wind turbines comprising:
a variable speed control system, the control system having an initial rotational speed set point value, wherein the initial rotational speed set point value is a maximum rotational speed set point for the wind turbine;
at least one sensor arranged and disposed to obtain at least two measured operational parameters; and
wherein the control system is selectively configured to compare the at least two measured operation parameters to a mechanical load of the wind turbine, wherein if the mechanical load of the wind turbine is decreased as a result of the at least two measured operational parameters, then a speed control adjustment program is activated, wherein the speed adjustment control program determines an adjusted rotational speed set point greater than the initial rotational speed set point value in response to the at least two measured and compared operational parameters; and wherein the adjusted rotational speed set point increases the maximum rotational speed set point of the wind turbine.

2. The wind plant of claim 1, further comprising a central monitoring station, the central monitoring station being selectively configured to selectively permit adjustment of the control system in response to an external requirement.

3. The wind plant of claim 1, wherein the measured operational parameter are at least two parameters selected from the group consisting of generator speed, power output, turbulence intensity, wind speed, wind direction, a combination of ambient temperature and air pressure, air density, component temperatures, generator torque, electrical current in generator rotor, electrical current in generator stator, voltage in generator rotor, voltage in generator stator, power factor, tower top vibration, drive train vibration, yaw position and combinations thereof.

4. The wind plant of claim 1, wherein the operational parameters are at least two parameters selected from the group consisting of an air turbulence intensity, air density, tower vibration, ambient temperature, wind turbine component temperature, yaw position and combinations thereof.

5. The wind plant of claim 2, wherein the external requirement is selected from the group consisting of a site property, an electrical requirement and combinations thereof.

6. The wind plant of claim 2, wherein the external requirement is a maximum power output.

7. The method of claim 2, wherein the external requirement is further comprises a power factor.

8. A method of operating a wind plant comprising:
providing a plurality of wind turbines, the plurality of wind turbines each having a variable speed control system, the control system having an initial rotational speed set point value, wherein the initial rotational speed set point value is a maximum rotational speed set point for each of the plurality of wind turbines;
obtaining at least two measured operational parameters from one or more sensors;
comparing the at least two measured operational parameters to a mechanical load of the turbine, wherein if the mechanical load of the turbine is decreased as a result of the at least two measured operational parameters, then a speed control adjustment method is activated, the speed control adjustment method comprising:
determining an adjusted rotational speed set point greater than the initial rotational speed set point value in response to the at least two measured and compared operational parameters; and
configuring the control system with the adjusted rotational speed set point, wherein the adjusted rotational speed set point increases the maximum rotational speed set point of each of the plurality of wind turbines.

9. The method of claim 8, further comprising providing a central monitoring station, the central monitoring station being selectively configured to selectively permit adjustment of the control system in response to an external requirement.

10. The method of claim 8, wherein the measured operational parameters are at least two parameters selected from the group consisting of generator speed, power output, turbulence intensity, wind speed, wind direction, wind shear, a combination of ambient temperature and air pressure, air density, component temperatures, generator torque, electrical current in generator rotor, electrical current in generator stator, voltage in generator rotor, voltage in generator stator, power factor, tower top vibration, drive train vibration, yaw position and combinations thereof.

11. The method of claim 8, wherein the measured operational parameters are at least two parameters selected from the group consisting of an air turbulence intensity, air density, tower vibration, ambient temperature, wind turbine component temperature, yaw position and combinations thereof.

12. The method of claim 8, wherein the one or more sensors are arranged and disposed on or in close proximity to the wind turbine.

13. The method of claim 9, further comprising obtaining an external requirement and permitting selective configuration of the control system in response to the external requirement.

14. The method of claim 13, wherein the external requirement is selected from the group consisting of a site property, an electrical requirement and combinations thereof.

15. The method of claim 13, wherein the external requirement is a maximum power output.

16. The method of claim 13, wherein the external requirement further comprises a power factor.

17. The method of claim 13, wherein the external requirement is a power factor.

* * * * *